United States Patent
Akemann et al.

(10) Patent No.: US 9,091,257 B2
(45) Date of Patent: Jul. 28, 2015

(54) COMPRESSOR AND CLUTCH DEVICE

(75) Inventors: Volker Akemann, Hannover (DE); Joachim Grosskopf, Ronnenberg (DE); Stefan Herzog, Pattensen (DE); Steffen Krebs, Gronau (DE); Andreas Pretsch, Laatzen (DE); Ralf Stoffels, Gerdau (DE); Ingo Stumberg, Hannover (DE)

(73) Assignee: WABCO GmbH, Hannover (DE)

( * ) Notice: Subject to any disclaimer, the term of this patent is extended or adjusted under 35 U.S.C. 154(b) by 510 days.

(21) Appl. No.: 13/262,894

(22) PCT Filed: Jan. 16, 2010

(86) PCT No.: PCT/EP2010/000226
§ 371 (c)(1),
(2), (4) Date: Nov. 1, 2011

(87) PCT Pub. No.: WO2010/124750
PCT Pub. Date: Nov. 4, 2010

(65) Prior Publication Data
US 2012/0039728 A1    Feb. 16, 2012

(30) Foreign Application Priority Data
Apr. 28, 2009  (DE) .......................... 10 2009 018 843

(51) Int. Cl.
*F04B 35/00* (2006.01)
*F04B 17/05* (2006.01)
*F16C 3/14* (2006.01)
*F16C 33/10* (2006.01)
*F01M 1/06* (2006.01)

(52) U.S. Cl.
CPC ............... *F04B 17/05* (2013.01); *F04B 35/002* (2013.01); *F16C 3/14* (2013.01); *F16C 33/1055* (2013.01); *F01M 1/06* (2013.01)

(58) Field of Classification Search
CPC .......... F01P 3/08; F16C 9/02; F16C 33/1065; F16C 3/14; F16C 9/04; F16C 2360/22; F16C 33/1055; F16C 33/1085; F01M 2011/026; F01M 11/02; F01M 1/06
USPC ..................... 417/223, 319; 192/85.17, 85.37
See application file for complete search history.

(56) References Cited

U.S. PATENT DOCUMENTS

| | | | | |
|---|---|---|---|---|
| 1,945,374 A | * | 1/1934 | Papaefthemeou | 277/449 |
| 4,129,404 A | * | 12/1978 | Korner et al. | 417/364 |
| 4,586,875 A | * | 5/1986 | Aman, Jr. | 417/228 |
| 4,869,211 A | * | 9/1989 | Heberle et al. | 123/41.35 |

(Continued)

FOREIGN PATENT DOCUMENTS

| | | |
|---|---|---|
| DE | 20 2006 019 190 U1 | 5/2008 |
| EP | 0 122 015 A1 | 10/1984 |

(Continued)

*Primary Examiner* — Peter J Bertheaud
*Assistant Examiner* — Dominick L Plakkoottam
(74) *Attorney, Agent, or Firm* — Kramer Levin Naftalis & Frankel LLP

(57) ABSTRACT

A compressor for generating compressed air in a vehicle includes at least one piston, a cylinder, a crankshaft, a lubricant connection, a lubricant supply channel, and a clutch device by means of which the crankshaft can be connected to or disconnected from a drive device. The lubricant supply channel opens into at least one lubricant outlet in the interior of the compressor directed toward a piston running surface of the cylinder at least in particular rotational positions of the crankshaft.

11 Claims, 3 Drawing Sheets

(56) References Cited

U.S. PATENT DOCUMENTS

| | | | |
|---|---|---|---|
| 5,469,777 A * | 11/1995 | Rao et al. | 92/223 |
| 6,907,848 B2 * | 6/2005 | Beardmore | 123/41.35 |
| 7,249,577 B1 * | 7/2007 | Zhang et al. | 123/41.35 |
| 7,281,854 B2 * | 10/2007 | Terada et al. | 384/288 |
| 7,954,600 B2 * | 6/2011 | Ohta | 184/6.5 |
| 2002/0063017 A1 * | 5/2002 | Paczuski | 184/6.16 |
| 2008/0252019 A1 * | 10/2008 | Yu | 277/434 |

FOREIGN PATENT DOCUMENTS

| | | |
|---|---|---|
| EP | 0 238 336 A1 | 9/1987 |
| EP | 0 284 388 A2 | 9/1988 |
| GB | 2 162 255 A | 1/1986 |
| GB | 2 182 732 A | 5/1987 |

* cited by examiner

COMPRESSOR AND CLUTCH DEVICE

FIELD OF THE INVENTION

The present invention generally relates to a compressor for generating compressed air in a vehicle. The compressor is disconnectable from or connectable to a drive via a clutch device, for example a shut-off clutch.

BACKGROUND OF THE INVENTION

A compressor of the general type under consideration is described in DE 20 2006 019 190 U1.

The use of a known shut-off clutch on compressors has the advantage that, in order to save energy, the compressor can be disconnected from a drive, for example the drive engine of the vehicle, if compressed air generation is not required. Without such a shut-off clutch, it has been usual hitherto to let the compressor run constantly with the drive engine and merely to switch it to a pneumatically neutral state in phases in which compressed air generation is not required. The introduction of a shut-off clutch to engage and disengage the compressor has the consequence that, upon being connected, the compressor is subjected to greater wear than in constant operation.

SUMMARY OF THE INVENTION

It is therefore an object of the invention to improve the wear resistance and therefore the durability of the compressor even when a clutch device is used.

In accordance with a preferred embodiment of the present invention, a compressor for generating compressed air in a vehicle includes at least one piston; a cylinder; a crankshaft; a lubricant connection; a lubricant supply channel; and a, clutch device by which the crankshaft is one of connectable to and disconnectable from a drive arrangement. The lubricant supply channel opens into at least one lubricant outlet in an interior region of the compressor. The lubricant outlet is directed towards a piston running surface of the cylinder in at least one rotational position of the crankshaft.

Still other objects and advantages of the present invention will in part be obvious and will in part be apparent from the specification.

The present invention accordingly comprises the features of construction, combination of elements, and arrangement of parts all as exemplified in the constructions herein set forth, and the scope of the invention will be indicated in the claims.

BRIEF DESCRIPTION OF THE DRAWINGS

The invention is explained in more detail below with reference to exemplary embodiments and to the appended drawings, in which.

In the figures, the same reference numerals are used for corresponding elements.

DETAILED DESCRIPTION OF THE PREFERRED EMBODIMENTS

Figure 1:
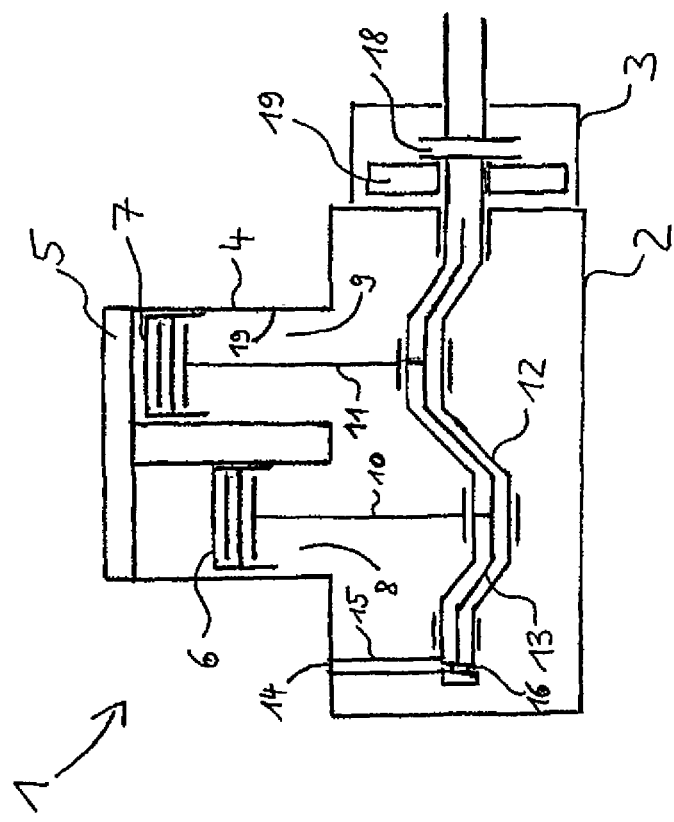
FIG. 1 shows a twin-cylinder compressor in a schematic representation.

FIG. 1 shows a compressor 1 with a compressor housing 2 and a clutch device 3 arranged on the compressor housing 2. The clutch device 3 is in the form of a pneumatically actuatable shut-off clutch. For this purpose the clutch device 3 has a pneumatic actuating cylinder 19 by means of which, upon pneumatic pressurization thereof, a coupling 18, for example clutch plates or clutch disks, can be pressed against or disengaged from one another. The clutch device 3 connects a crankshaft 12 of the compressor 1 to a drive shaft of a drive arrangement (not shown in detail) of a vehicle, for example the vehicle engine.

The compressor 1 has a first cylinder 8 and a second cylinder 9. A first piston 6 is arranged in the first cylinder 8. A second piston 7 is arranged in the second cylinder 9. The first piston 6 is connected to the crankshaft 12 via a first connecting rod 10 and corresponding bearings. The second piston 7 is connected to the crankshaft 12 via a second connecting rod 11, likewise via corresponding bearings. For the sake of simplicity, the mounting of the pistons 6, 7 and of the crankshaft 12 in the corresponding bearing eyes of the connecting rods 10, 11 is represented only schematically in FIG. 1. In practice, suitable sliding or rolling bearings are used for this purpose. The cylinders 8, 9 are arranged in a cylinder housing 4 of the compressor 1. The cylinder housing 4 forms part of the housing 2.

A valve and control block 5, which contains, for example, the inlet and outlet valves for the aspiration of compressed air and the discharge thereof to units located downstream, such as compressed air reservoirs, is arranged on the cylinder housing 4. The valve block 5 may be configured as described in DE 197 451 18 A1, for example.

In order to lubricate the pistons 6, 7 in the respective cylinders 8, 9, the compressor 1 has a lubricant supply. Oil, for example the engine oil of the vehicle engine, can be used, for example, as the lubricant. The lubricant supply of the compressor 1 has a lubricant connection 14 that is connectable to the engine oil supply of the vehicle engine. From the lubricant connection 14 a first lubricant passage 15 leads through the housing 2 to a lubricant supply groove 16 running around the crankshaft 12. The lubricant supply groove 16 is connected to a lubricant supply channel section 13 disposed inside the crankshaft 12 in the form of a hollow channel. The channel section 13 is connected to lubricant outlet points in the region of the connecting rods 10, 11, which outlet points are explained in greater detail below with reference to FIG. 2. The use of the peripheral lubricant supply groove 16 has the advantage that the lubricant can be distributed around the circumference of the crankshaft 12 and can thereby be fed relatively quickly and uniformly into the lubricant channel section 13.

The lubricant is usually pressurized and can be subjected to a pressure of approximately 3 to 4 bar. A lubricant supply that is independent of the movement of the compressor, that is, which also operates when the compressor is stationary, is thereby made possible.

Figure 2:
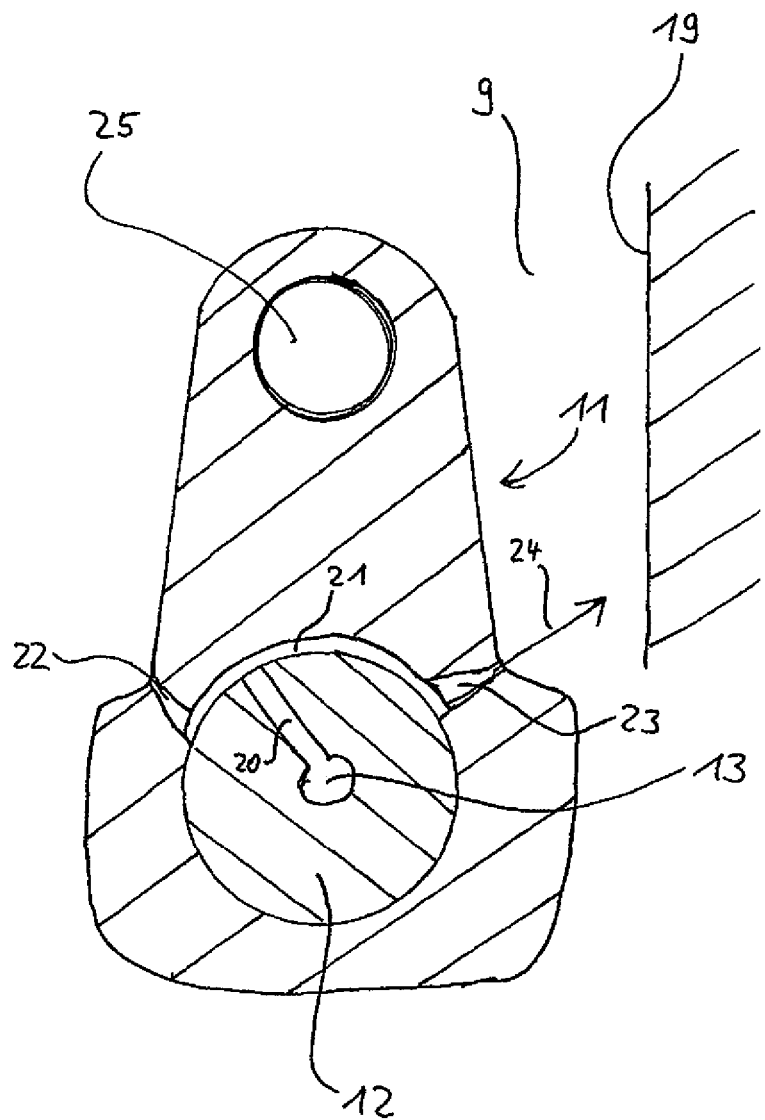
FIG. 2 shows a splash-type connecting rod in a sectional representation.

FIG. 2 shows the connecting rod 11 in a sectional representation. The cylinder wall 19 of the cylinder 9 is additionally shown. The connecting rod 11 has a connecting rod eye 25 connected to the piston 7. A further (lower) connecting rod eye surrounds the crankshaft 12, which is also reproduced in a sectional representation in FIG. 2. A bearing, for example a ball bearing, is provided between the crankshaft 12 and the connecting rod eye surrounding the crankshaft, which bearing is not represented explicitly in FIG. 2 for the sake of simplicity. As can be seen, the channel section 13 is connected to a radial lubricant section 20 in the crankshaft 12, which serves to introduce lubricant into the connecting rod 11. The connecting rod 11 has, in the region of the connecting rod eye that receives the crankshaft 12, a segmentally widened section 21 that forms a channel between the crankshaft and the inner face of the connecting rod eye. The widened section 21 can advantageously be implemented as a recess within the connecting rod eye. Alternatively or additionally, the section 21 can be in the form of a groove in the crankshaft 12. What is important is that a channel is formed for conducting the lubricant from the channel section 13 to lubricant outlets 22, 23. The recess 21 conducts the lubricant to the lubricant outlets 22, 23, which are provided on each side of the connecting rod 11. A configuration with only one lubricant outlet 22 or 23 is also possible; however, increased lubricant throughput can be achieved with a plurality of lubricant outlets. The lubricant outlets 22, 23 are configured to taper inwardly in the direction of the lubricant outlet orifice and thus are in the form of nozzles. Because of the overpressure of the lubricant and the nozzle effect of the lubricant outlets 22, 23, the lubricant is sprayed from the orifices and, as indicated by the arrow 24 in FIG. 2, impinges on the cylinder wall 19. Early and good lubrication of the cylinder wall with respect to the piston is thereby ensured, even when the compressor 1 is temporarily shut off by means of the clutch device 3.

The taper of the lubricant outlets 22, 23 may have a continuous or stepped configuration, with a linear or curved contour.

Figure 3:
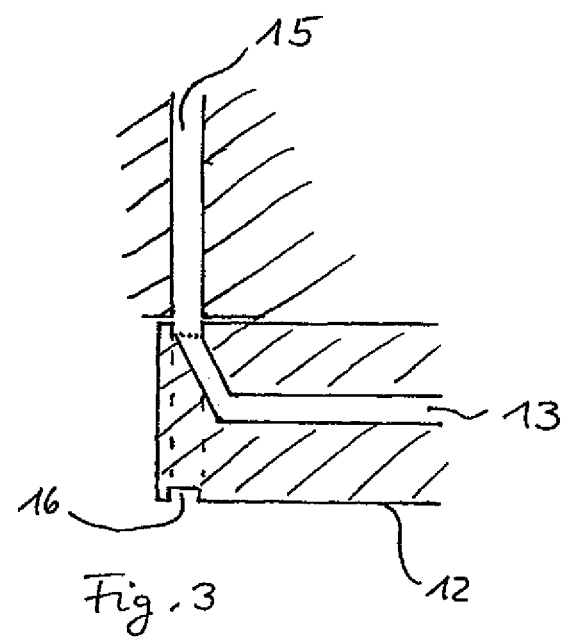
FIG. 3 shows the configuration of the lubricant supply on the inlet side.

FIG. 3 shows the connection of the crankshaft 12 to the lubricant connection 14 on the inlet side. As can be seen, the lubricant channel section 13 is connected to the peripheral groove 16 of the crankshaft 12. A connection to the lubricant passage 15 is thereby ensured in all rotation-angle positions of the crankshaft, so that a reliable and high throughput of lubricant through the passages 15, 13 is guaranteed.

In one embodiment of the present invention, the lubricant supply channel 13, 15, 16, 20, 21 additionally has a lubricant supply gallery with a plurality of lubricant nozzles arranged in a fixed manner in the crankshaft housing of the compressor 1. The lubricant nozzles are set up to spray the cylinder bore with lubricant. For this purpose the outlet points of the lubricant nozzles can be aligned towards the cylinder bore or cylinder wall 19. Lubrication of the compressor can thereby be further improved.

Figure 4:
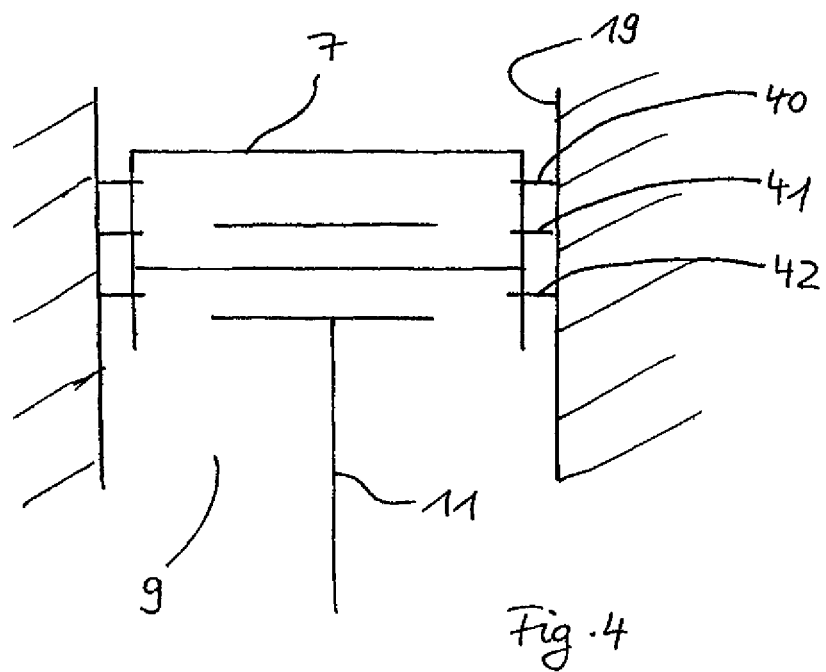
FIG. 4 shows a piston with piston rings.

FIG. 4 shows a detail of the cylinder 9 with the piston 7. The piston 7, and optionally also the piston 6, are provided with piston rings 40, 41, 42 arranged in circumferential grooves of the piston. The piston rings 40, 41 are in the form of compression rings and ensure an airtight seal of the compression chamber located above the piston 7 with respect to the crankshaft housing located below. Through the use of two compression rings increased airtightness can be achieved, as compared to the use of one compression ring. The piston ring 42 is in the form of an oil control ring. The oil control ring is intended to prevent oil from entering the compression chamber located above the piston 7. As can be seen, all the piston rings 40, 41 and 42 move along the cylinder running surface 19 as the piston 7 moves in the cylinder 9. In order to increase the durability of the compressor, the oil control ring 42 has a wear-reducing coating. The coating can advantageously contain chromium. In an advantageous configuration of the invention, the oil control ring 42 is configured to be chromium-plated on its outer face.

As is also apparent from FIG. 1, the clutch device 3 projects beyond the housing 2 of the compressor 1; that is, the clutch device is not integrated in the housing, as is known from DE 20 2006 019 190 U1. The clutch device 3 projects with at least a region containing the coupling 18, for example the clutch disks or plates, from the housing 2 of the compressor 1. The external arrangement of the clutch device offers the advantage of modularity. The inventive compressor having the same construction can therefore be used both with and without a clutch device. If required, the clutch device is merely screwed to the housing 2 of the compressor 1.

In summary, the compressor according to embodiments of the present invention variously has the following features:
 use of compression and oil control rings with increased wear resistance;
 pistons with additional bores in the second groove;
 splash-type connecting rods for lubricating the bore, for example as previously explained with reference to FIGS. 1 and 2, with one or two outlet orifices and/or additional piston pin lubrication;
 oil supply groove in upper part of connecting rod;
 groove in the crankshaft or in a bearing bush to increase oil throughput;
 oil supply gallery with nozzles for continuously spraying the cylinder bores
 the oil supply groove in the connecting rod can be precast asymmetrically; and
 the groove 16 in the crankshaft can be provided on only one side, for example on the non-drive side.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A compressor for generating compressed air in a vehicle, comprising at least one piston; a cylinder; a crankshaft; a lubricant connection; a lubricant supply channel having a channel section defined through the crankshaft; a connecting rod, an upper end of the connecting rod being connected to the at least one piston, and a lower end of the connecting rod having a connecting rod eye that receives the crankshaft, the connecting rod eye having a recess in its surface that forms a part of the lubricant supply channel; and a clutch device by which the crankshaft is one of connectable to and disconnectable from a drive arrangement, the lubricant supply channel opening into at least one lubricant outlet in an interior region of the compressor, a first lubricant outlet of the at least one lubricant outlet being disposed in the lower end of the connecting rod and remaining in communication with both the channel section and the recess during each rotation of the crankshaft, and an orifice of the first lubricant outlet being positioned such that lubricant exiting the orifice is directed toward a piston running surface of the cylinder in at least one rotational position of the crankshaft.

2. The compressor according to claim 1, further comprising at least one radial lubricant section defined inside the crankshaft and coupled to the channel section.

3. The compressor according to claim 1, wherein the crankshaft has a peripheral groove connected to the lubricant connection and to the channel section.

4. The compressor according to claim 1, wherein the first lubricant outlet extends from the surface of the connecting rod eye to an outer surface of the lower end.

5. The compressor according to claim 1, wherein a second lubricant outlet of the at least one lubricant outlet is disposed in the lower end of the connecting rod.

6. The compressor according to claim 5, wherein the second lubricant outlet remains in communication with both the channel section and the recess during each rotation of the crankshaft.

7. The compressor according to claim 1, wherein the first lubricant outlet tapers inwardly in the direction of the orifice.

8. The compressor according to claim 1, wherein the lubricant supply channel includes a lubricant supply gallery having a plurality of lubricant nozzles fixedly arranged in a crankcase of the compressor, the lubricant nozzles being configured to spray a bore of the cylinder with lubricant.

9. The compressor as claimed in claim 1, further comprising an oil control ring on the at least one piston, the oil control ring having a wear-reducing coating.

10. The compressor according to claim 9, wherein the coating contains chromium.

11. The compressor according to claim 1, wherein at least a portion of the clutch device comprises at least one coupling that projects from a housing of the compressor.

* * * * *